United States Patent [19]

Schmidt et al.

[11] Patent Number: 5,332,621
[45] Date of Patent: Jul. 26, 1994

[54] COMPOSITE ARTICLES BY COMBINING A THERMOPLASTIC MOLDING AND FOAM

[75] Inventors: Friedrich-Georg Schmidt; Herbert Knipp, both of Haltern; Wilhelm Münninghoff, Troisdorf, all of Fed. Rep. of Germany

[73] Assignee: Huels Aktiengesellschaft, Marl, Fed. Rep. of Germany

[21] Appl. No.: 31,287

[22] Filed: Mar. 12, 1993

[30] Foreign Application Priority Data

Mar. 12, 1992 [DE] Fed. Rep. of Germany ....... 4207897

[51] Int. Cl.$^5$ .............................................. C08L 71/12
[52] U.S. Cl. ................................. 428/318.4; 428/521; 156/307.1; 525/132; 264/45.1; 521/71
[58] Field of Search ............... 428/318.4, 521; 156/307.1; 525/132; 264/45.1; 521/71

[56] References Cited

U.S. PATENT DOCUMENTS

| | | | |
|---|---|---|---|
| 3,891,487 | 6/1975 | Hoey | 264/48 |
| 4,800,120 | 1/1989 | Jadamus et al. | 428/286 |
| 4,816,345 | 3/1989 | Jadamus et al. | 428/521 |
| 4,835,063 | 5/1989 | Jadamus et al. | 428/495 |
| 4,921,762 | 5/1990 | Jadamus et al. | 428/521 |
| 5,153,076 | 10/1992 | Jadamus et al. | 428/527 |

*Primary Examiner*—John Kight, III
*Assistant Examiner*—Rachel Johnson
*Attorney, Agent, or Firm*—Oblon, Spivak, McClelland, Maier & Neustadt

[57] ABSTRACT

A composite article is prepared by intimately bonding a latex foam with a thermoplastic molded part containing polyphenylene ether, the latex consisting of the following components, relative to its total rubber content:

I. 20–100% by weight of SBR latex with a minimum proportion of more than 15% by weight of styrene in the solid polymer, and II. 80–0% by weight of natural-rubber latex or other, synthetic latexes.

The combination is vulcanized to form a product which exhibits cohesive rupture within the foam body, when the foam body is subjected to separation.

9 Claims, No Drawings

COMPOSITE ARTICLES BY COMBINING A THERMOPLASTIC MOLDING AND FOAM

BACKGROUND OF THE INVENTION

1. Field of the Invention

The present invention relates to a process through which an intimate bonding between latex foam materials and certain rigid materials can be produced, as well as to parts formed by this process.

2. Description of the Background

Foam materials are employed for many purposes such as for upholstered furniture, mattresses, and many other applications in the furniture industry; for the interiors of vehicles in the automobile industry; for pipe insulation and sound deadening materials in the building industry; and in many other fields. It is frequently difficult, however, to install foamlike elastic materials or to combine them with rigid thermoplastic materials. Up to this time, adhesives have been used, or attempts have been made to achieve a certain adhesion with mechanical stapling or notching. In such cases a thermoplastic structural material, of such form as injection molded, extruded, blow molded pressed, laminated or otherwise produced plastic components is used.

Surprisingly, it has now been found that by using certain thermoplastic structural materials during the vulcanization process, an intimate bonding is produced between a latex foam material and the thermoplastic structural material. In this manner stable foam-plastic composite articles can be produced in one step.

Composite articles of thermoplastics and rubber are well known. Thus, EP-A-O 196 407, for example, describes a process for producing a combination between plastic compositions based on polyphenylene ethers, on one side, and sulfur-vulcanized rubbers containing double bonds on the other. In this case, the rubbers contain filling materials and plasticizers. The co-vulcanization, however, is successful only when it is carried out at temperatures between 140° and 200°. Of course the polymer compositions must show a correspondingly high heat deflection temperature under load, which severely restricts their composition and in addition requires difficult processing. The use of latex rubber for this process appeared to promise little success. It is not only to be expected that the water present as a third phase would disturb co-vulcanization, but above all the limitation of the temperature for co-vulcanization to a maximum of about 100° C. appears to be prohibitive. For these reasons the formation of a stable combination is not expected.

SUMMARY OF THE INVENTION

Accordingly, one object of the present invention is to provide a plastic-foam, composite article in which intimate bonding between latex foam material and a rigid supporting thermoplastic occurs.

Briefly, this object and other objects of the present invention as hereinafter will become more readily apparent can be attained in a thermoplastic composition comprising a combination of the following components:
(A) 10-100 parts by weight (ppw) of polyphenylene ethers;
(B) 0-80 ppw of polystyrene;
(C) 0-30 ppw of impact modifiers;
(D) 0-40 ppw of reinforcing agents and/or fillers;
(E) 0-30 ppw of flame retardants, and
(F) 0-15 ppw of additive materials,
the composition having a heat deflection temperature under load, according to ISO 75, Method B, of greater than 90° C., preferably greater than 100 ° C.

DETAILED DESCRIPTION OF THE PREFERRED EMBODIMENTS

Under the terms of this invention, thermoplastic compositions are understood to mean unshaped mixtures that are subject to being processed to make molded parts or semi-finished articles. For example, polymer compositions can exist as granulates.

The polyphenylene ether (PPE) component of the present composition is essentially built up from units having the structural formula:

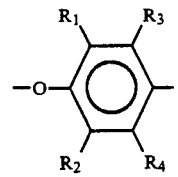

where $R_1$ and $R_2$ represent either an n-alkyl group with up to 6 carbon atoms, or $R_1$ represents H and $R_2$ a tertiary alkyl residue with up to 6 C atoms; $R_3$ and $R_4$ represent, independently of each other, a methyl group or hydrogen. In a preferred embodiment $R_1=R_2=CH_3$ and $R_3=R_4=H$.

The polyphenylene ethers can be prepared from the corresponding phenols or 4-halophenols by any process known in the art.

Usually, copper-amine complexes or systems containing manganese are used as catalysts (see DE-OSS 32 24 692 and 32 24 691, as well as U.S. Pat. Nos. 3,306,874, 3,306,875, and 4,028,341.

The viscosity numbers determined in accordance with DIN 53 728 in trichloromethane at 25° C., are in the range from 35 to 100 ml/g (J-values according to DIN 53 728; concentration 5 g/l). Polyphenylene ethers with a viscosity number of 40 to 70 ml/g are preferred. Of course modified polyphenylene ethers may be employed such as graft copolymers with vinyl monomers, styrene, or other modifying agents. The polyphenylene ethers are customarily employed as powders or granulates.

Suitable polystyrene components (B) include both styrene homopolymers and impact modified styrene polymers. Styrene itself and in addition styrenes alkylated on the ring or side chains are preferred monovinyl aromatic compounds. Preferably, however, only styrene is used. The homopolymers are prepared according to known processes of bulk, solution or suspension polymerization (see Ullmann's *Encyclopadie der Technischen Chemie*, v. 19, p. 265, Verlag Chemie, Weinheim 1980). The homopolymers can exhibit an average molecular weight (Mv) of 1,000 to 250,000. The most often used processes for producing impact-modified styrene polymers are bulk or solution polymerization and processes for bulk/suspension polymerization, such as are described, for example, in U.S. Pat. Nos. 2,694,692 and 2,862,906. Of course, however, any other known process can also be used.

In order to modify the impact resistance rating of styrene polymers the customarily used types of natural or synthetic rubber are employed. Suitable rubbers include natural rubber, polybutadiene, polyisoprene, and mixed polymers such as statistical, sequential, or block copolymers of butadiene and/or isoprene with styrene and other co-monomers, which have a glass transition temperature below −20° C. Butadiene polymers with a 1,4-cis content lying between 25 and 99% are especially suitable. Acrylate rubber, EPDM, polybutylene, and polyoctenamer rubbers can also be used. The resulting impact-modified styrene polymers possess a soft component content of 10 to 60% by weight, preferably 20 to 45% by weight. The particle size of the soft components should be in the range from 0.2 to 8 μm.

Suitable impact-modifying additives (C) are, for example, the block copolymers of various structure and mainly composed of vinyl aromatic and conjugated diene blocks which are described in DE-ASS 19 32 234, 20 00 118, DE-OSS 22 55 930, 27 50 515, 24 34 848, 30 38 551, EP-A-O 080 666, and WO-A-83/01 254.

However, other impact-modifying additives such as polyoctenamers, graft or block copolymers composed of vinyl aromatic monomers and EP(D)M, acrylate rubbers, or mixtures of SBR (styrene-butadiene) rubbers with high or low styrene content can also be used.

Such materials as short, long, or continuous glass fibers and organic or mineral fillers like talcum or glass beads can be used as reinforcing agents or fillers (D).

The thermoplastic composition of the present invention may contain flame retardants (E) selected from the group of aromatic phosphates or phosphine oxides such as triphenyl phosphate, diphenylcresyl phosphate, and/or diphenylisopropylphenyl phosphate. It is also known that flame retardants containing halogens can be used, too. For example, organic compounds such as those described in H. Vogel's monograph, "Flammfestmachen von Kunststoffen", pp. 94-102, Hüthig Press, 1966, come into consideration. Likewise halogenated polymers, such as halogenated polyphenylene ether (e.g., DE-OS 33 34 068), and brominated polyphenylene ethers or brominated oligostyrenes or polystyrene preferably with an amount of halogen higher than 30 percent per weight, can be employed as fire resistant agents. In the event flame retardants containing halogens are used, it is recommended that compounds with antimony, boron, and/or tin in proportions of 0.5-10% by weight relative to the thermoplastic composition be added, in order to increase the fire-resistant effect. In DE-OS 29 06 336 and DE-OS 39 04 207 special hydrocarbon flame retardant systems are described which can be included in the thermoplastic composition.

The composition according to the invention may contain additives (F) such as pigments, organic colorants, oligomers, antistatic agents, stabilizers, and processing auxiliaries. Suitable stabilizers include organic phosphites, such as didecylphenyl phosphite and trilauryl phosphite, sterically hindered, phenols, derivatives of tetramethylpiperidine, benzophenone-, and triazole derivatives, as well as stabilizers based on hindered amines, the so-called HALS compounds. Polyethylene or waxes, such as oxidized hydrocarbons, as well as esters or amide derivatives, or their salts with alkalis or alkaline earth metals, are examples for suitable processing auxiliaries.

The individual components of the composition are mixed in the melt in a known manner, either in batch operation or continuously.

The conventional equipment for handling highly viscous melts is suitable for melting and mixing Twin-screw kneaders and co-kneaders are particularly suitable.

Thermoplastic compositions according to the invention are preferably prepared by melting and mixing the polyphenylene ether, where appropriate together with the impact modifier and/or a styrene polymer and components (D) to (F). Components (B) to (F) can also be incorporated in the melt of (A). For example, a continuously operating co-rotating twin-screw kneader can be used. The melt temperature is between 250° and 350° C., preferably between 270° and 320° C. It is expedient to degas the melt simultaneously. From this thermoplastic composition the molded parts to be used in the composite material can be produced by all methods for thermoplastic processing known in the art, such as injection molding, extrusion, blow molding, or press molding. It is important, however, that the surface of the molded parts is neither contaminated, exposed to oxidizing influences, nor is passivated by other influences.

Under the terms of the present invention, a type of latex is used which consists of the following components, depending on the total rubber content:

I. 20-100% by weight of SBR latex, with a minimum proportion of more than 15% by weight of styrene in the solid polymer, and II. 80-0% by weight of natural-rubber latex or other, synthetic latexes.

Synthetic latexes that are suitable for mixing with the SBR latex are in this case those such as polychloroprene latexes (CR) and acrylonitrile latexes (NBR). Such latexes are well-known to the man skilled in the art, so that further description is superfluous. Customarily they are obtained by emulsion polymerization in the presence of a common fat soap and/or a resin soap. To influence the hardness, it may be wise in many cases to add a reinforcing latex as known in the art. In any case, at the marginal proportion in the mixture, that is, with an SBR content of only 20% by weight, acceptable results are not obtained in all cases. It is therefore preferable for the latex to contain at least 32% by weight of SBR latex relative to the total rubber content, especially when the styrene content of the latex is relatively low.

Another area of preference arises from the fact that the following formula is to be observed in the latex mixtures:

100 < (the percent of PPE in the thermoplastic composition) + (the percent of SBR in the latex mixture used);

here again it is preferred that the latex mixture contain more than 50% by weight of SBR latex.

In latex mixtures that contain 32-50% by weight of SBR latex, a further preferred relationship is established by the following formula:

130 < (the percent of PPE in the thermoplastic composition) + (the percent of SBR in the latex mixture used).

The latexes used are to have a solids content of at least 55%, preferably 60% of the composition, according to DIN 53 563.

The latex compound can further contain particulate fillers customary in rubber technology such as chalk, kaolin, pulverized slate, and aluminum hydroxide.

Furthermore, the latex compound normally contains a known vulcanization system. A preferred vulcanization system contains sulfur in combination with the customary accelerators. The amount of the vulcanization system is governed by the remaining components and can in any given case be determined by simple exploratory experiments. Other customary additives include light stabilizers add antioxidants, thickening agents, such as carboxymethyl celluloses, and flame retardant additives.

From such a latex compound a latex foam is produced in a manner known in the art. The mass is whisked up with air or other gas and is brought up to the desired density. The density of the latex foam is not critical in this case. Even in the marginal instances of very little to no foaming, the adhesion in the composite is very good. Such marginal cases are also within the scope of the present invention.

After a suitable degree of foaming has been reached, customary gelling agents such as sodium silicofluoride, ammonium acetate, or carbon dioxide are mixed into the foam, and the foam is placed in a mold together with the carriers consisting of thermoplastic molded parts; or if the carrier itself makes up the mold, it is placed on it or poured into it.

The mold charged with the foam and with the carrier, if present, is then placed into an applicator for vulcanization, which is heated with steam, for example. After vulcanization, the composite of latex foam and thermoplastic is removed from the mold, if necessary, and then washed and dried.

Gelling and vulcanization can also be accomplished by exposure to infrared radiation or even with microwave radiation, if special materials are used as the mold, as is described in DE-OS 39 00 809.

In the marginal case where there is no foaming, that is, when a latex film is applied, the addition of a gelling agent is not necessary.

Vulcanization is performed under the conditions known in the art for the manufacture of latex foam or film.

With regard to more precise details on the production, composition, and processing of suitable latexes, reference is made to DE-OSS 34 47 585 and 37 04 118.

Having generally described this invention, a further understanding can be obtained by reference to certain specific examples which are provided herein for purposes of illustration only and are not intended to be limiting unless otherwise specified. In the following examples, the following materials are used:

As a polyphenylene ether (A), a poly-2,6-dimethyl-1,4-phenylene ether having a solution viscosity (J value) of 63 ml/g is used.

The polystyrene (B) used in the examples is an impact modified type of polystyrene that can be purchased under the name of VESTYRON® 616-30 from the Hüls Corporation (AG), Marl.

As impact modifiers, VESTENAMER® 8012 (Hüls AG, Marl) (C11) or DURANIT® (Hüls AG, Marl) (C2) are used in the examples.

Short glass fibers (D1) designated VETROTEX® EC 10 P327 (Vetrotex Deutschland GmbH, Herzogenrath) served to reinforce the polymer composition.

Titanium dioxide R-FKD (Bayer AG, Leverkusen) is used as an example of filler material (D2) in the examples described herebelow.

Triphenyl phosphate (DISFLAMOLL® TP, Bayer AG, Leverkusen) is employed in the examples as a flame retardant (E).

MARLOTHERM® S (Hüls AG, Marl) was elected as a suitable additive (F).

In the comparative examples the following materials are used:

Polypropylene: VESTOLEN® P 7000 (Hüls AG, Marl)

Polyethersulfone: ULTRASON® E 1000 (BASF AG, Ludwigshafen);
Polycarbonate: MAKROLON® 2800 (Bayer AG, Leverkusen);
Polybutylene terephthalate: VESTODUR® 2000 (Hüls AG, Marl);
Polystyrene: VESTYRON® 640-30 and VESTYRON® 616-30 (both Hüls AG, Marl).

Plates with the dimensions of 130×130×2 mm are injection molded from thermoplastic compositions for use in the test specimens.

The following latexes are used in the experiments:

Styrene-butadiene copolymers: BUNATEX® SL 2800 (L1) (28% styrene, latex solid content 67%);
and BUNATEX® SL 3510 (L2) (35% styrene, latex solid content 68%) (both Hüls AG, Marl);
and also blends of L1 with various natural-rubber latex contents:
L3=100% natural-rubber latex, low ammonia type;
L4=80% natural-rubber latex;
L5=60% natural-rubber latex;
L6=40% natural-rubber latex.

The latex foam is produced by the well-known foam whipping process. In this process the latex is mixed with substances facilitating vulcanization and processing and brought to the desired density by whisking up with air. After foaming the gelling substance is mixed in. The addition of the gelling substance is designed to be of such manner and in such volume as to yield a gelling time for the latex foam of about 20 minutes at a temperature of about 18° C.

The following recipes are used:

|  | Parts by weight | |
| --- | --- | --- |
|  | wet | dry |
| L1 to L6 | 149.3 | 100 |
| Potassium oleate | 4.4 | 0.75 |
| Dispersed vulcanizer | 18.0 | 9.0 |
| Sodium carboxymethyl cellulose | 10.0 | 0.25 |
| Dispersed sodium silicofluoride | 8.0 | 2.0 |

The vulcanizers are finely dispersed in water with the use of a colloid mill. The formulation is as follows:

|  | Parts by weight |
| --- | --- |
| Sulfur | 2.0 |
| Zinc-N-diethyl dithiocarbamate | 1.0 |
| Zinc-2-mercaptobenzothiazole | 1.0 |
| Diphenyl guanidine | 1.0 |
| Zinc oxide | 3.0 |
| Anti-aging substances | 1.0 |
| Bentonite | 0.09 |
| VULTAMOL® | 0.45 |
| Distilled water | 8.46 |

A sodium silicofluoride dispersion is also prepared with the use of a dispersing agent in a colloid mill. The formulation is as follows:

|  | Parts by weight |
| --- | --- |
| Sodium silicofluoride | 25 |
| Bentonite | 2 |
| Potassium hydroxide (10% in water) | 1 |
| Distilled water | 72 |

The composition in parts by weight of the thermoplastic molding compositions within the scope of the present invention is shown in the following table:

| Example No. | A | B | C1 | C2 | D1 | D2 | E | F | Designator | Heat deflection temperature (°C.) |
|---|---|---|---|---|---|---|---|---|---|---|
| 1–7 | 60 | 230 | 10 | 10 | 0 | 14 | 0 | 0 | P1 | 111 |
| 8–15 | 90 | 10 | 10 | 5 | 0 | 10 | 13 | 0 | P2 | 129 |
| 16–23 | 94 | 8 | 9 | 0 | 0 | 0 | 0 | 0 | P3 | 188 |
| 24–29 | 60 | 50 | 10 | 0 | 0 | 0 | 17 | 0 | P4 | 101 |
| 30–32 | 60 | 70 | 10 | 10 | 0 | 10 | 0 | 0 | P5 | 126 |
| 33–38 | 90 | 0 | 5 | 0 | 0 | 0 | 0 | 4 | P6 | 169 |
| 39–43 | 94 | 9 | 5 | 0 | 12 | 0 | 0 | 0 | P7 | 190 |

Test specimens are prepared as follows: After producing the latex foam and spreading a layer of foam about 1 cm thick on a glass plate, a strip of cloth is laid on it and another layer of foam placed on top. The freshly injection molded thermoplastic part is laid on this bed of foam. It is necessary to activate the surface of a few plates that have been stored for several days and have not been protected from the effect of sunshine and heat by washing them with squares of cloth soaked in acetone or toluene, or by washing them off with a soap solution. These test specimens are now heated to a temperature of about 100° C. in a few minutes (about 2 to 6 min) by microwave heating and held at that temperature for a period of 8 to 10 min, in order to gel and vulcanize the latex foam. The microwave applicator has a frequency of 2.45 GHz and a power density of 20 kW/m³.

The quality of the bonding between the latex foam and the thermoplastic material is judged by pulling on the strip of cloth that has been laid down at an angle of 90° to the plastic plate. The tension force applied is so increased in each case that it has led either to peeling off the foam from the thermoplastic surface, or to a rupture in the foam. Peeling off the foam layer from the plastic plate is counted as showing adhesive bonding. A rupture in the foam bed means that the bonding force of the foam to the plastic part is greater than the resistance of the foam itself to tearing or tearing away from itself (cohesive rupture). In judging the quality of the latex foam bonding, distinction is made between adhesive rupture (Ad=0 points); cohesive rupture (K=2 points) and partial bonding (t=1 point).

EXAMPLE 1

The PPE thermoplastic composition described above as P1 is vulcanized in the manner described with latex foam L1 whipped to a density of 70 g/l. The bonding test gives a sum of 11 points in 6 trials.

EXAMPLE 2

The PPE thermoplastic composition described above as P1 is vulcanized in the manner described with latex foam L1 whipped to a density of 100 g/l. The bonding test gives a sum of 10 points in 6 trials.

EXAMPLE 3

The PPE thermoplastic composition described above as P1 is vulcanized in the manner described with latex foam L1 whipped to a density of 150 g/l. The bonding test gives a sum of 11 points in 6 trials.

EXAMPLE 4

The PPE thermoplastic composition described above as P1 is vulcanized in the manner described with latex foam L2 whipped to a density of 70 g/l. The bonding test gives a sum of 11 points in 6 trials.

EXAMPLE 5

The PPE thermoplastic composition described above as P1 is vulcanized in the manner described with latex foam L2 whipped to a density of 100 g/l. The bonding test gives a sum of 11 points in 6 trials.

EXAMPLE 6

The PPE thermoplastic composition described above as P1 is vulcanized in the manner described with latex foam L2 whipped to a density of 150 g/l. The bonding test gives a sum of 11 points in 6 trials.

COMPARATIVE EXAMPLE 7

The PPE thermoplastic composition described above as P1 is vulcanized in the manner described with latex foam L3 whipped to a density of 100 g/l. The bonding test gives a sum of 0 points in 6 trials.

EXAMPLE 8

The PPE thermoplastic composition described above as P2 is vulcanized in the manner described with latex foam L1 whipped to a density of 70 g/l. The bonding test gives a sum of 12 points in 6 trials.

EXAMPLE 9

The PPE thermoplastic composition described above as P2 is vulcanized in the manner described with latex foam L1 whipped to a density of 100 g/l. The bonding test gives a sum of 10 points in 6 trials.

EXAMPLE 10

The PPE thermoplastic composition described above as P2 is vulcanized in the manner described with latex foam L1 whipped to a density of 150 g/l. The bonding test gives a sum of 11 points in 6 trials.

EXAMPLE 11

The PPE thermoplastic composition described above as P2 is vulcanized in the manner described with latex foam L2 whipped to a density of 70 g/l. The bonding test gives a sum of 10 points in 6 trials.

EXAMPLE 12

The PPE thermoplastic composition described above as P2 is vulcanized in the manner described with latex foam L2 whipped to a density of 100 g/l. The bonding test gives a sum of 10 points in 6 trials.

EXAMPLE 13

The PPE thermoplastic composition described above as P2 is vulcanized in the manner described with latex foam L2 whipped to a density of 150 g/l. The bonding test gives a sum of 11 points in 6 trials.

COMPARATIVE EXAMPLE 14

The PPE thermoplastic composition described above as P2 is vulcanized in the manner described with latex foam L3 whipped to a density of 100 g/l. The bonding test gives a sum of 0 points in 6 trials.

EXAMPLE 15

The PPE thermoplastic composition described above as P2 is vulcanized in the manner described with latex foam L6 whipped to a density of 100 g/l. The bonding test gives a sum of 12 points in 6 trials.

EXAMPLE 16

The PPE thermoplastic composition described above as P3 is vulcanized in the manner described with latex foam L1 whipped to a density of 70 g/l. The bonding test gives a sum of 10 points in 6 trials.

EXAMPLE 17

The PPE thermoplastic composition described above as P3 is vulcanized in the manner described with latex foam L1 whipped to a density of 100 g/l. The bonding test gives a sum of 11 points in 6 trials.

EXAMPLE 18

The PPE thermoplastic composition described above as P3 is vulcanized in the manner described with latex foam L1 whipped to a density of 150 g/l. The bonding test gives a sum of 12 points in 6 trials.

EXAMPLE 19

The PPE thermoplastic composition described above as P3 is vulcanized in the manner described with latex foam L2 whipped to a density of 70 g/l. The bonding test gives a sum of 11 points in 6 trials.

EXAMPLE 20

The PPE thermoplastic composition described above as P3 is vulcanized in the manner described with latex foam L2 whipped to a density of 100 g/l. The bonding test gives a sum of 10 points in 6 trials.

EXAMPLE 21

The PPE thermoplastic composition described above as P3 is vulcanized in the manner described with latex foam L2 whipped to a density of 150 g/l. The bonding test gives a sum of 12 points in 6 trials.

COMPARATIVE EXAMPLE 22

The PPE thermoplastic composition described above as P3 is vulcanized in the manner described with latex foam L3 whipped to a density of 100 g/l. The bonding test gives a sum of 0 points in 6 trials.

EXAMPLE 23

The PPE thermoplastic composition described above as P3 is vulcanized in the manner described with latex foam L6 whipped to a density of 100 g/l. The bonding test gives a sum of 11 points in 6 trials.

EXAMPLE 24

The PPE thermoplastic composition described above as P4 is vulcanized in the manner described with latex foam L1 whipped to a density of 100 g/l. The bonding test gives a sum of 12 points in 6 trials.

EXAMPLE 25

The PPE thermoplastic composition described above as P4 is vulcanized in the manner described with latex foam L2 whipped to a density of 100 g/l. The bonding test gives a sum of 11 points in 6 trials.

COMPARATIVE EXAMPLE 26

The PPE thermoplastic composition described above as P4 is vulcanized in the manner described with latex foam L3 whipped to a density of 100 g/l. The bonding test gives a sum of 1 point in 6 trials.

EXAMPLE 27

The PPE thermoplastic composition described above as P4 is vulcanized in the manner described with latex foam L4 whipped to a density of 100 g/l. The bonding test gives a sum of 5 points in 6 trials.

EXAMPLE 28

The PPE thermoplastic composition described above as P4 is vulcanized in the manner described with latex foam L5 whipped to a density of 100 g/l. The bonding test gives a sum of 10 points in 6 trials.

EXAMPLE 29

The PPE thermoplastic composition described above as P4 is vulcanized in the manner described with latex foam L6 whipped to a density of 100 g/l. The bonding test gives a sum of 9 points in 6 trials.

EXAMPLE 30

The PPE thermoplastic composition described above as P5 is vulcanized in the manner described with latex foam L1 whipped to a density of 100 g/l. The bonding test gives a sum of 11 points in 6 trials.

EXAMPLE 31

The PPE thermoplastic composition described above as P5 is vulcanized in the manner described with latex foam L2 whipped to a density of 100 g/l. The bonding test gives a sum of 11 points in 6 trials.

COMPARATIVE EXAMPLE 32

The PPE thermoplastic composition described above as P5 is vulcanized in the manner described with latex foam L3 whipped to a density of 100 g/l. The bonding test gives a sum of 0 points in 6 trials.

EXAMPLE 33

The PPE thermoplastic composition described above as P6 is vulcanized in the manner described with latex foam L1 whipped to a density of 100 g/l. The bonding test gives a sum of 11 points in 6 trials.

EXAMPLE 34

The PPE thermoplastic composition described above as P6 is vulcanized in the manner described with latex foam L2 whipped to a density of 100 g/l. The bonding test gives a sum of 10 points in 6 trials.

COMPARATIVE EXAMPLE 35

The PPE thermoplastic composition described above as P6 is vulcanized in the manner described with latex foam L3 whipped to a density of 100 g/l. The bonding test gives a sum of 0 points in 6 trials.

EXAMPLE 36

The PPE thermoplastic composition described above as P6 is vulcanized in the manner described with latex foam L4 whipped to a density of 100 g/l. The bonding test gives a sum of 5 points in 6 trials.

EXAMPLE 37

The PPE thermoplastic composition described above as P6 is vulcanized in the manner described with latex foam L5 whipped to a density of 100 g/l. The bonding test gives a sum of 10 points in 6 trials.

EXAMPLE 38

The PPE thermoplastic composition described above as P6 is vulcanized in the manner described with latex foam L6 whipped to a density of 100 g/l. The bonding test gives a sum of 10 points in 6 trials.

EXAMPLE 39

The PPE thermoplastic composition described above as P7 is vulcanized in the manner described with latex foam L1 whipped to a density of 100 g/l. The bonding test gives a sum of 10 points in 6 trials.

EXAMPLE 40

The PPE thermoplastic composition described above as P7 is vulcanized in the manner described with latex foam L2 whipped to a density of 100 g/l. The bonding test gives a sum of 10 points in 6 trials.

COMPARATIVE EXAMPLE 41

The PPE thermoplastic composition described above as P7 is vulcanized in the manner described with latex foam L3 whipped to a density of 100 g/l. The bonding test gives a sum of 0 points in 6 trials.

EXAMPLE 42

The PPE thermoplastic composition described above as P7 is vulcanized in the manner described with latex foam L5 whipped to a density of 100 g/l. The bonding test gives a sum of 9 points in 6 trials.

EXAMPLE 43

The PPE thermoplastic composition described above as P7 is vulcanized in the manner described with latex foam L6 whipped to a density of 100 g/l. The bonding test gives a sum of 8 points in 6 trials.

COMPARATIVE EXAMPLE 44

Polypropylene (VESTOLEN® P 7000) is vulcanized in the manner described with latex foam L1 whipped to a density of 100 g/l. The bonding test gives a sum of 0 points in 6 trials.

COMPARATIVE EXAMPLE 45

Polypropylene (VESTOLEN® P 7000) is vulcanized in the manner described with latex foam L6 whipped to a density of 100 g/l. The bonding test gives a sum of 0 points in 6 trials.

COMPARATIVE EXAMPLE 46

Polyethersulfone (ULTRASON® E 1000) is vulcanized in the manner described with latex foam L1 whipped to a density of 100 g/l. The bonding test gives a sum of 0 points in 6 trials.

COMPARATIVE EXAMPLE 47

Polyethersulfone (ULTRASON® E 1000) is vulcanized in the manner described with latex foam L6 whipped to a density of 100 g/l. The bonding test gives a sum of 0 points in 6 trials.

COMPARATIVE EXAMPLE 48

Polycarbonate (MAKROLON® 2800) is vulcanized in the manner described with latex foam L1 whipped to a density of 100 g/l. The bonding test gives a sum of 0 points in 6 trials.

COMPARATIVE EXAMPLE 49

Polycarbonate (MAKROLON® 2800) is vulcanized in the manner described with latex foam L6 whipped to a density of 100 g/l. The bonding test gives a sum of 0 points in 6 trials.

COMPARATIVE EXAMPLE 50

Polybutylene terephthalate (VESTODUR® 2000) is vulcanized in the manner described with latex foam L1 whipped to a density of 100 g/l. The bonding test gives a sum of 0 points in 6 trials.

COMPARATIVE EXAMPLE 51

Polybutylene terephthalate (VESTODUR® 2000) is vulcanized in the manner described with latex foam L6 whipped to a density of 100 g/l. The bonding test gives a sum of 0 points in 6 trials.

COMPARATIVE EXAMPLE 52

Polystyrene (VESTYRON® 616-30) is vulcanized in the manner described with latex foam L1 whipped to a density of 100 g/l. The bonding test gives a sum of 10 points in 6 trials; in this case, however, the thermoplastic plates show severe deformation in each trial.

COMPARATIVE EXAMPLE 53

Polystyrene (VESTYRON® 616-30) is vulcanized in the manner described with latex foam L2 whipped to a density of 100 g/l. The bonding test gives a sum of 10 points in 6 trials; in this case, however, the thermoplastic plates show severe deformation in each trial.

COMPARATIVE EXAMPLE 54

Polystyrene (VESTYRON® 616-30) is vulcanized in the manner described with latex foam L4 whipped to a density of 100 g/l. The bonding test gives a sum of 0 points in 6 trials; in this case, moreover, the thermoplastic plates show severe deformation in each trial.

COMPARATIVE EXAMPLE 55

Polystyrene (VESTYRON® 616-30) is vulcanized in the manner described with latex foam L5 whipped to a density of 100 g/l. The bonding test gives a sum of 0 points in 6 trials; in this case, moreover, the thermoplastic plates show severe deformation in each trial.

COMPARATIVE EXAMPLE 56

Polystyrene (VESTYRON® 616-30) is vulcanized in the manner described with latex foam L6 whipped to a density of 100 g/l. The bonding test gives a sum of 2 points in 6 trials; in this case, moreover, the thermoplastic plates show severe deformation in each trial.

COMPARATIVE EXAMPLE 57

Polystyrene (VESTYRON® 640-30) is vulcanized in the manner described with latex foam L1 whipped to a density of 100 g/l. The bonding test gives a sum of 9 points in 6 trials; in this case, however, the thermoplastic plates show severe deformation in each trial.

COMPARATIVE EXAMPLE 58

Polystyrene (VESTYRON® 640-30) is vulcanized in the manner described with latex foam L2 whipped to a density of 100 g/l. The bonding test gives a sum of 9 points in 6 trials; in this case, however, the thermoplastic plates show severe deformation in each trial.

EXAMPLE 59

Corresponding to the preceding examples, bonding with unfoamed latex is studied. In this case the latexes that have not been whipped and contain no gelling agents, are laid in the form of a film over the thermoplastic plates; a strip of cloth is laid thereon, and covered with another film. Then vulcanization is done as in the previous cases, and then the adhesion is tested. The combinations of latex and thermoplastic composition and the results can be drawn from the following table:

|    | P1 | P6         | P7         |
|----|----|------------|------------|
| L1 | 10 | not tested | 11         |
| L2 | 9  | 11         | not tested |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A composite article, comprising:
  a thermoplastic molded object whose surface is bonded to a foamed latex material as the wet foamed latex material in contact with said thermoplastic molded object is vulcanized, said thermoplastic molded object constituted of the following components:
   a) 10–100 parts by weight (ppw) of polyphenylene ether (PPE) which is essentially made up of units having the structural formula:

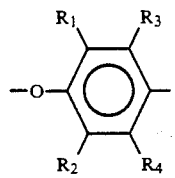

wherein $R_1$ and $R_2$ each is an n-alkyl group of up to 6 carbon atoms or $R_1$ represents hydrogen and $R_2$ a tertiary alkyl of up to 6 C atoms; $R_3$ and $R_4$ represent, independently of each other, a methyl group or hydrogen;
   b) 0–80 ppw of styrene polymer;
   c) 0–30 ppw of impact modifiers;
   d) 0–40 ppw of reinforcing agents and/or fillers;
   e) 0–30 ppw of flame retardants; and
   f) 0–15 ppw of customary additives, the formulation having a heat deflection temperature, according to ISO 75, Method B, of greater than 90° C.;
  and the foamed latex consisting of, relative to the total rubber content of the foamed latex,
   I) 20–100% by weight of SBR latex with a minimum proportion of more than 15% by weight of styrene in the solid polymer, and
   II) 80–0% by weight of natural-rubber latex or at least one other synthetic latex, with the remaining constituents being vulcanizing agents, processing agents and gelling agents.

2. The composition article of claim 1, wherein the latex portion, considered as a dry component relative to the total rubber content, contains at least 32% by weight of SBR latex.

3. The composition of claim 1 or 2, wherein, in the latex mixtures which contain more than 50% by weight of SBR latex, the following formula defines the scope of the formulation: 100 < (the percent of PPE in the thermoplastic composition) + (the percent of SBR latex in the latex mixture used).

4. The composite article of claim 1 or 2, wherein, in the latex mixtures which contain 32–50% by weight of SBR latex, the following formula defines the scope of the formulation: 130 < (the percent of PPE in the thermoplastic mass) + (the percent of SBR latex in the latex mixture used).

5. The composite article of claim 1, wherein the latex compound contains fillers, light stabilizers, antioxidants, thickeners, and/or flame retardants.

6. The composite article of claim 1, wherein, in the polyphenylene ether, $R_1$ and $R_2$ each stand for $CH_3$ and $R_3$ and $R_4$ each stand for hydrogen.

7. The composite article of claim 1, which further comprises polyoctenamer as an impact modifier.

8. The composite article of claim 1, wherein the heat deflection temperature of the thermoplastic composition according to ISO 75, Method B, is greater than 100° C.

9. A process of preparing a thermoplastic composition-latex composite object according to claim 1, which comprises:
  foaming a latex by whisking it up with air or another gas, and then vulcanizing the foamed latex while in contact with a molded part which consists of the thermoplastic composition under vulcanization conditions.

* * * * *